(12) United States Patent
Ball

(10) Patent No.: US 8,322,518 B2
(45) Date of Patent: Dec. 4, 2012

(54) CAROUSEL CONVEYOR AND METHOD

(75) Inventor: Jonathan Ball, Sydney (AU)

(73) Assignee: Laitram, L.L.C., Harahan, LA (US)

( * ) Notice: Subject to any disclaimer, the term of this patent is extended or adjusted under 35 U.S.C. 154(b) by 356 days.

(21) Appl. No.: 12/760,603

(22) Filed: Apr. 15, 2010

(65) Prior Publication Data

US 2011/0253507 A1 Oct. 20, 2011

(51) Int. Cl.
*B65G 37/00* (2006.01)

(52) U.S. Cl. ..... 198/580; 198/604; 198/617; 198/626.1; 198/779

(58) Field of Classification Search ........ 198/580, 198/604, 605, 617, 620, 626.1, 779
See application file for complete search history.

(56) References Cited

U.S. PATENT DOCUMENTS

| | | | |
|---|---|---|---|
| 6,494,312 B2 | 12/2002 | Costanzo et al. | |
| 6,758,323 B2 * | 7/2004 | Costanzo | 198/457.02 |
| 7,007,792 B1 * | 3/2006 | Burch | 198/457.02 |
| 7,097,029 B2 * | 8/2006 | Halang | 198/779 |
| 7,191,894 B2 | 3/2007 | Costanzo et al. | |
| 7,344,018 B2 | 3/2008 | Costanzo et al. | |
| 7,461,739 B2 | 12/2008 | Fourney | |
| 7,506,751 B2 | 3/2009 | Fourney | |
| 7,731,010 B2 | 6/2010 | Kissee et al. | |
| 7,900,768 B2 * | 3/2011 | Fourney | 198/779 |
| 7,926,647 B2 * | 4/2011 | Fourney | 198/803.9 |
| 7,971,701 B2 * | 7/2011 | Fourney | 198/370.09 |
| 8,123,021 B2 * | 2/2012 | Depaso et al. | 198/370.09 |
| 2009/0173598 A1 | 7/2009 | Fourney | |
| 2010/0108468 A1 | 5/2010 | Fourney | |

FOREIGN PATENT DOCUMENTS

WO 2009114439 A2 9/2009

* cited by examiner

*Primary Examiner* — Douglas Hess
(74) *Attorney, Agent, or Firm* — James T. Cronvich

(57) ABSTRACT

Apparatus and method for recirculating articles on a belt conveyor. An article-recirculation path is formed in a pair of parallel conveyor belts running continuously in opposite directions. Article-supporting rollers in each belt rotate to transfer articles from one belt to the other in a transfer region at each end of the conveyor to form an endless recirculation path.

20 Claims, 5 Drawing Sheets

CAROUSEL CONVEYOR AND METHOD

BACKGROUND

The invention relates generally to power-driven conveyors and more particularly to a carousel conveyor and method for recirculating articles atop conveyor belts having rotatable article-supporting rollers.

A conveyor carousel is used to accumulate and recirculate articles until they can be selectively removed from the conveyor. One typical carousel used in the meat-packing industry to recirculate vacuum-packed bags, e.g., CRYOVAC® bags, of meat comprises a pair of side-by-side conveyors running in opposite directions. Bars angled across the conveyors at each end divert the bags from one conveyor to the other so that an endless recirculation path is formed. But the bags can get pinched between the bars and the conveyor. In some cases, the pinching can cause pin pricks in the bags. Often the pin pricks are too small to be detected by QC inspectors, but their mere presence can be enough to cause a food quality and safety issue.

Thus, there is a need for a recirculation system that avoids this shortcoming.

SUMMARY

In one aspect of the invention, one version of a recirculating conveyor embodying features of the invention comprises a pair of conveyor belts advancing in opposite directions through a recirculation section of the conveyor. The recirculation section extends in length from a first end to a second end and laterally from a first side to a second side. A first one of the conveyor belts advances continuously along the first side of the recirculation section in a first direction from the first end to the second end. The second conveyor belt of the pair advances continuously along the second side of the recirculation section in an opposite second direction from the second end to the first end. Each belt has rotatable article-supporting rollers. The rollers in each belt are rotated in a first lateral direction in a first transfer region of the recirculation system proximate the first end to push articles off the second conveyor belt, onto the first conveyor belt, and toward the first side of the conveyor. The rollers are rotated in an opposite second lateral direction in a second transfer region proximate the second end to push articles off the first conveyor belt, onto the second conveyor belt, and toward the second side.

In another aspect of the invention, a method for recirculating articles on a conveyor comprises: (a) conveying articles atop rollers in first and second conveyor belts advancing continuously in opposite directions; (b) rotating the rollers in the first and second conveyor belts in a first lateral direction in a first transfer region at one end of a recirculation section of the conveyor to push articles atop the rollers off the second conveyor belt and onto the first conveyor belt in the first transfer region; and (c) rotating the rollers in an opposite second lateral direction in a second transfer region at the opposite end of the recirculation section to push articles atop the rollers off the first conveyor belt and onto the second conveyor belt in the second transfer region.

BRIEF DESCRIPTION OF THE DRAWINGS

These features and aspects of the invention, as well as its advantages, are better understood by referring to the following description, appended claims and accompanying drawings, in which:

DETAILED DESCRIPTION

Figure 1:
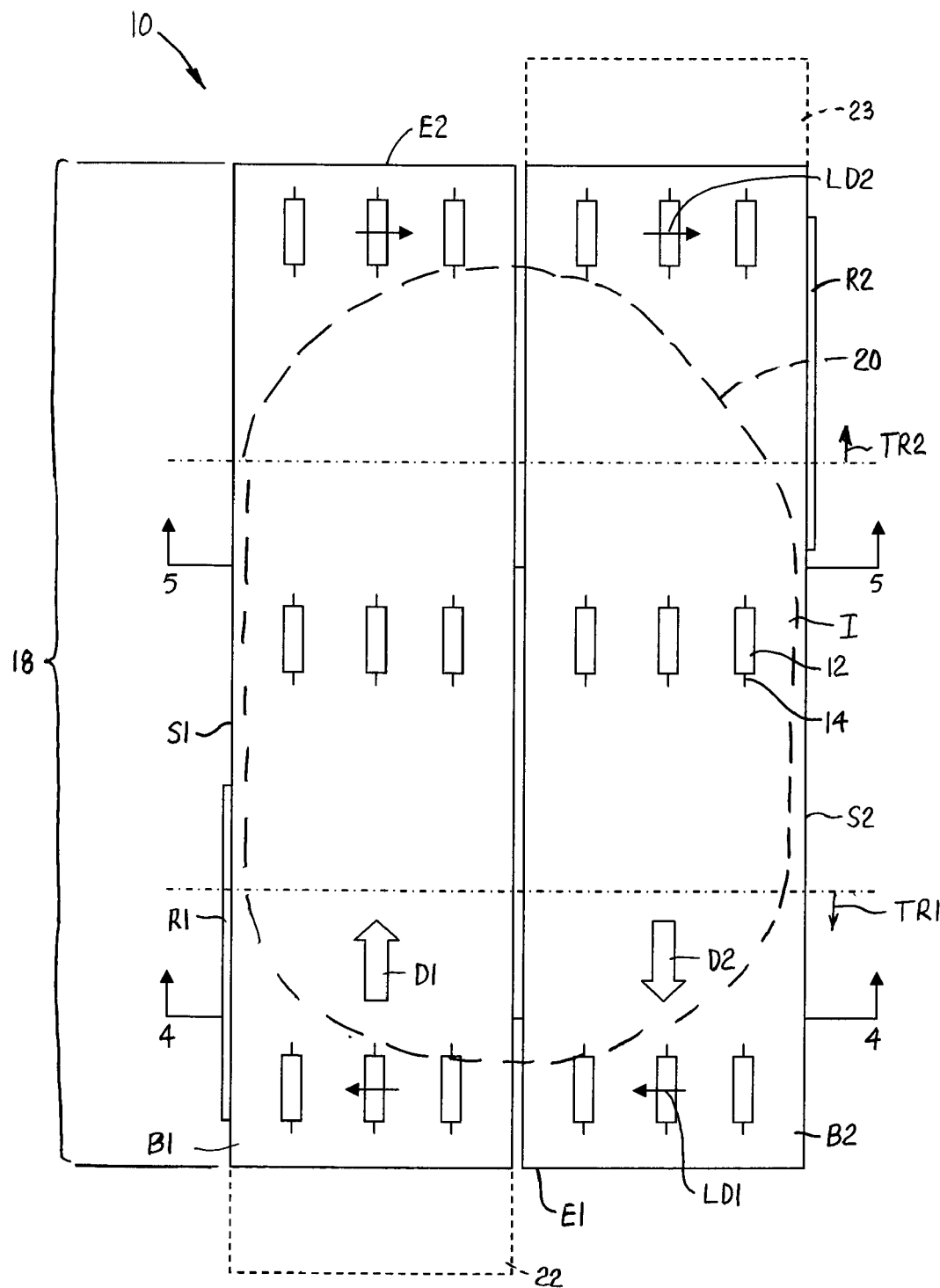
FIG. 1 is a top plan view of one version of a recirculating conveyor embodying features of the invention.
Figure 2:
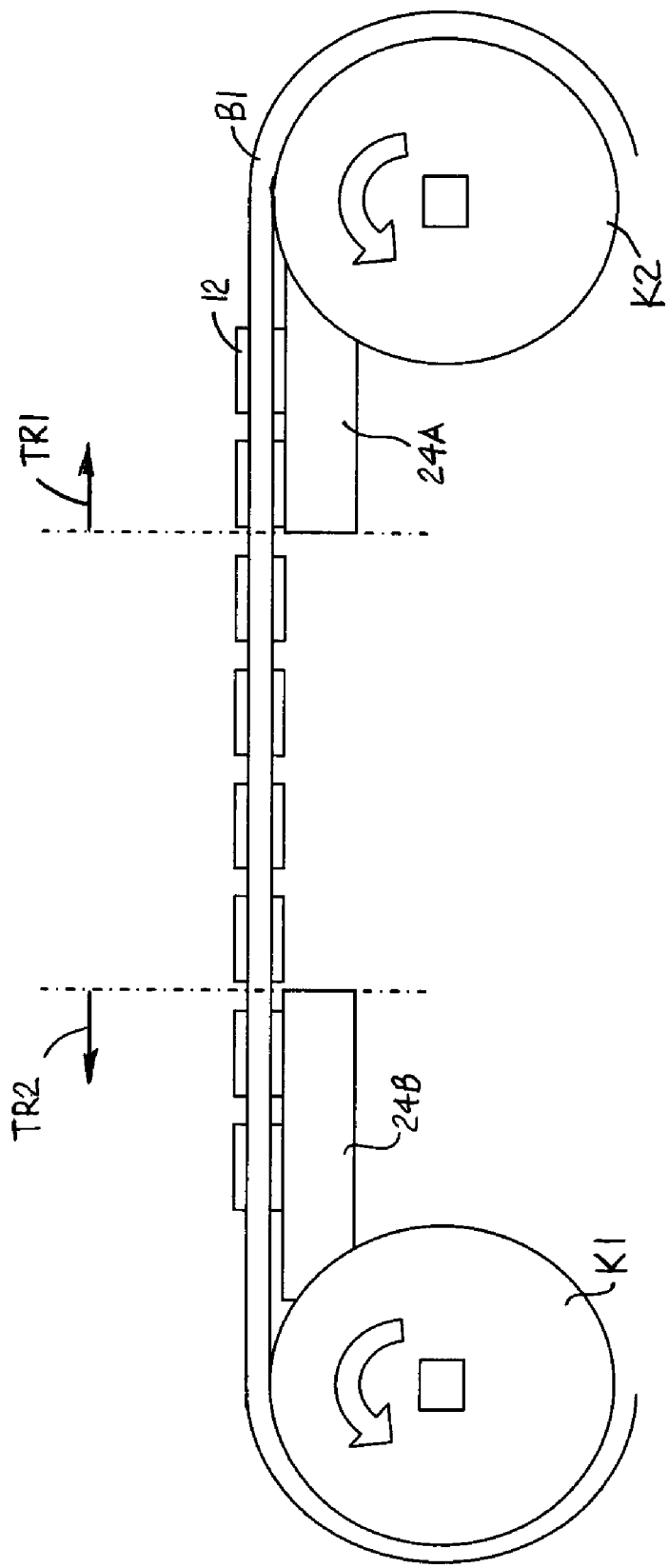
FIG. 2 is a side elevation view of the upper carryway portion of the recirculating conveyor of FIG. 1.
Figure 3:
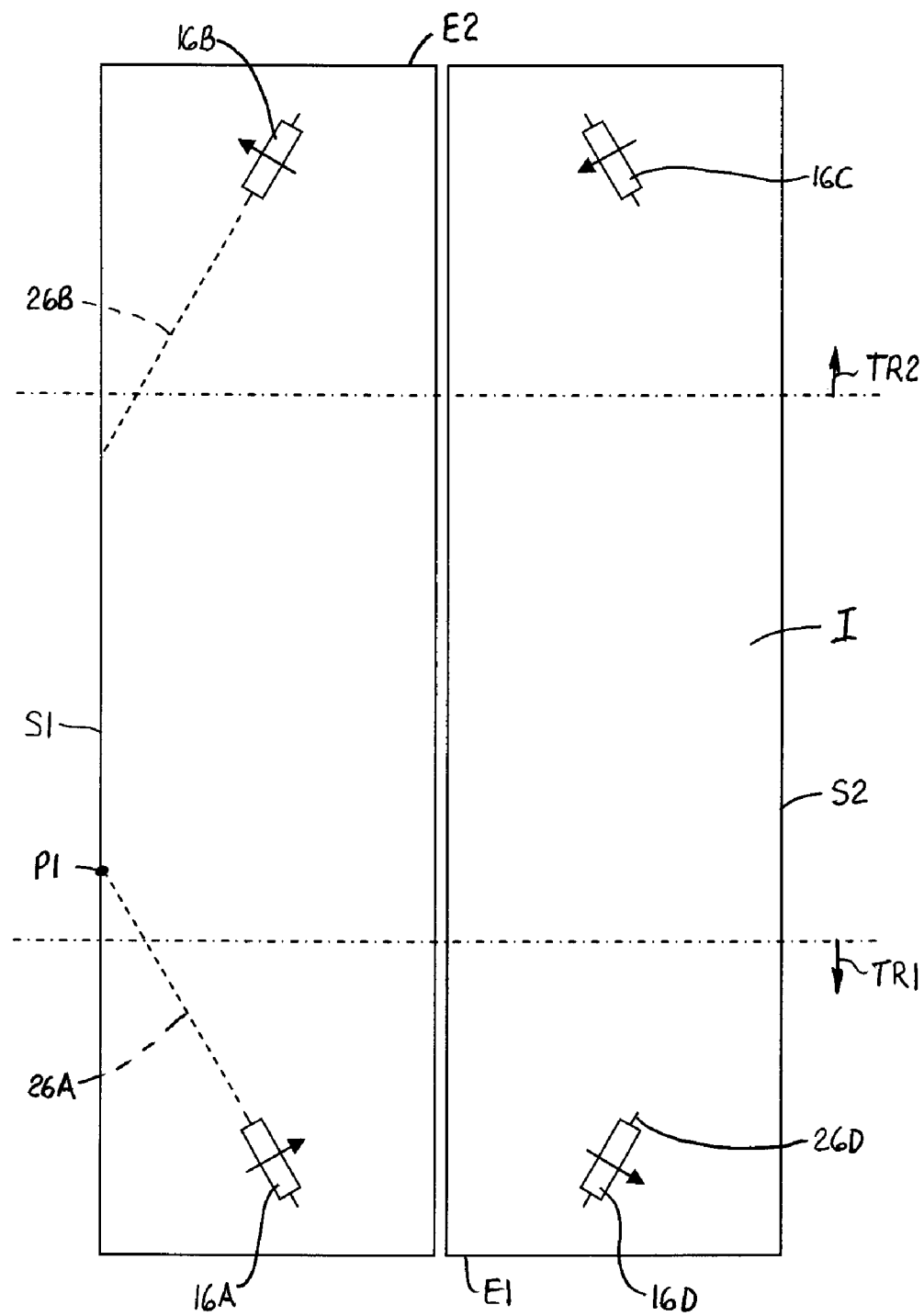
FIG. 3 is a top plan view of the conveyor of FIG. 1 with the conveyor belts removed to show underlying bearing surfaces.

One version of a conveyor embodying features of the invention and forming a carousel for recirculating articles is shown in FIGS. 1 and 2. The conveyor 10 comprises a pair of conveyor belts B1, B2 advancing continuously in opposite first and second directions D1, D2 along a carryway. Each belt is trained between its own shaft-mounted drive and idle sprocket sets K1, K2. The belts shown are modular plastic conveyor belts having article-supporting rollers 12 that are rotatable on axes 14 parallel to the first and second directions. The rollers 12 extend through the thickness of the belts, as shown in FIG. 2. An example of such a belt is the INTRALOX® Series 7000 belt manufactured and sold by Intralox, L.L.C. of Harahan, La., U.S.A. The belt rollers 12 are actuated into rotation in either lateral direction LD1, LD2 by arrays 24A, 24B of bearing rollers 16A-16D underlying the belts along the carryway, as shown in FIGS. 2 and 3. A description of the operation of such an actuated-roller belt is described in U.S. Pat. No. 7,461,739, "Systems and Methods for Diverting Objects" Dec. 9, 2008, to Matthew L. Fourney. The disclosure of that patent is incorporated by reference.

As shown in FIG. 1, the conveyor 10 includes a recirculation section 18 that extends from a first end E1 to an opposite second end E2 in the first conveying direction D1 and laterally in width from a first side S1 to an opposite second side S2. The first conveyor belt B1 advances along the first side S1, and the second conveyor belt B2 advances in the opposite direction along the second side S2. In a first transfer region TR1 proximate the first end E1 of the recirculation section, the belt rollers 12 are actuated to rotate in a first lateral direction LD1 by contact with the underlying bearing rollers 16D, 16A (shown in FIGS. 3 and 4). The belt rollers in the first transfer section TR1 push articles conveyed atop them off the second conveyor belt B2 onto the first conveyor belt B1 and toward the first side S1 of the recirculation section 18. In a similar way, the belt rollers 12 are actuated to rotate in an opposite second lateral direction LD2 in a second transfer region TR2 to push articles conveyed atop the belt rollers 12 off the first conveyor belt B1 onto the second conveyor belt B2 and toward the second side S2 of the recirculation section 18. In an intermediate region I between the first and second transfer regions TR1, TR2, the rollers are idled to prevent further active lateral translation of the articles. In this way, an endless recirculation path 20 of the articles is formed on the conveyor. The lengths of the transfer regions TR1, TR2 and of the intermediate region I depend on a number of factors, such as belt speed, belt width, the coefficient of friction between the articles and the rollers, and the length of the recirculation path required to handle the volume of articles. If, for example, the volume of the articles is low, the intermediate region I may be eliminated altogether. As another example, if the conveyor belts are wide, the lengths of the transfer regions TR1, TR2 will have to be long.

To prevent the articles from dropping off the first side S1 of the first conveyor belt B1 in the first transfer region TR1, a first side rail R1 is positioned along the first side. The side rail R1 may extend into the intermediate section I to prevent articles with lateral momentum from continuing to translate in the first lateral direction LD1 off the first side before reaching the rollers rotating in the opposite lateral direction LD2 in the second transfer region TR2. A second side rail R2 performs the same function on the second side S2.

As shown in FIG. 1, the two conveyor belts may be the same length, coterminous with the recirculation section 18. But the first conveyor belt could optionally extend past the first end E1 of the recirculation region to allow articles to be fed onto the conveyor on an extended portion 22. Likewise, the second conveyor belt B2 could include an optional extended portion 23 that extends past the second end E2 of the recirculation section 18. And, although the belts shown in FIG. 1 abut each other, they could be separated by a narrow gap or by a larger gap with a short transfer surface or conveyor between the belts in each transfer region.

Figure 4:
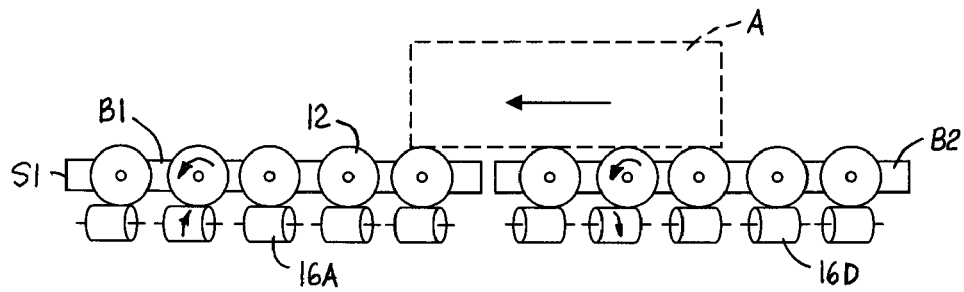
FIG. 4 is a portion of the cross section of the conveyor of FIG. 1 viewed along lines 4-4.

The actuation of the belt rollers is illustrated in FIGS. 2-5. The bearing rollers 16A-16D are arranged in arrays 24A, 24B underlying and contacting the belt rollers 12 in the transfer regions TR1, TR2. The bearing rollers may comprise a large number of densely arrayed, short-length rollers as shown or fewer longer rollers that extend in parallel obliquely across the entire width of the belt. The bearing rollers are arranged to rotate on axes 26A, 26B oblique to the axes 14 of the belt rollers. The axes 14A of the bearing rollers 16A under the first conveyor belt B1 in the first transfer region TR1 intersect the first side S1 of the conveyor at a point P1 downstream of the bearing rollers. This causes the rollers in the first conveyor belt B1 to rotate as shown in FIG. 4 as the bearing rollers rotate as shown. As a consequence, the belt rollers in the first conveyor belt push articles in the first transfer region toward the first side S1. The axes 26D of the bearing rollers 16D underlying the second conveyor belt B2 in the first transfer region TR1 are oblique to the axes 14 of the belt rollers 12 and to the axes 26A of the bearing rollers 16A under the first conveyor belt B1 in the first transfer region. In fact, the axes 26A, 26D are preferably oblique to the belt rollers' axes by the same angle, but in opposite directions. This causes the belt rollers of the second conveyor belt B2 to rotate as shown in FIG. 4 as the bearing rollers 16D rotate as shown. Articles A supported atop the rollers in the second conveyor belt B2 in the first transfer region are pushed in the same first lateral direction LD1 by the rollers in both belts to transfer articles from the first conveyor belt to the second conveyor belt. The bearing rollers 16B and 16C under the first and second conveyor belts B1, B2 in the second transfer region TR2 are obliquely arranged as shown to cause the belt rollers in the second transfer region to rotate in the opposite lateral direction LD2 to push articles toward the opposite second side S2.

Figure 5:
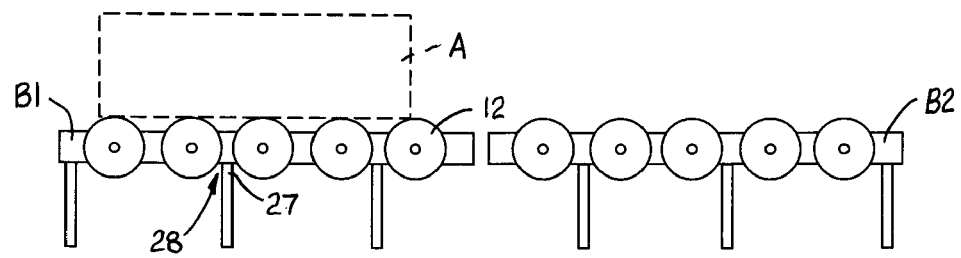
FIG. 5 is a portion of the cross section of the conveyor of FIG. 1 viewed along lines 5-5.

In the intermediate region I, as shown in FIG. 5, bearing rollers are absent. The belts B1, B2 are supported on wear strips 27 positioned in gaps 28 between the lanes of belt rollers 12. The idled rollers in the intermediate region do not actively push the supported articles A sidewise.

Thus, this first version of a recirculating conveyor provides a touchless carousel that eliminates the need for bars to guide articles from one belt to the other.

Figure 7:
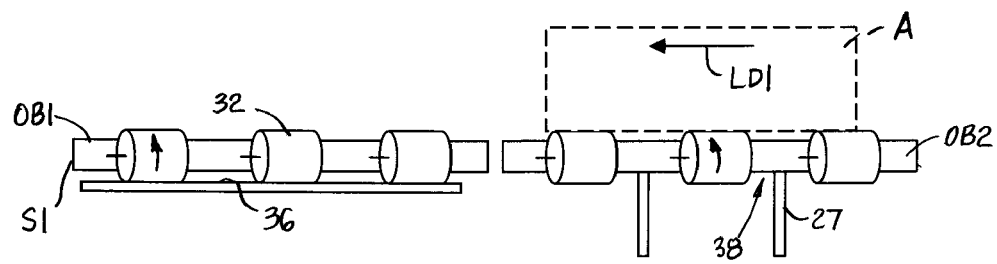
FIG. 7 is a portion of the cross section of the conveyor of FIG. 6 viewed along lines 7-7.
Figure 8:
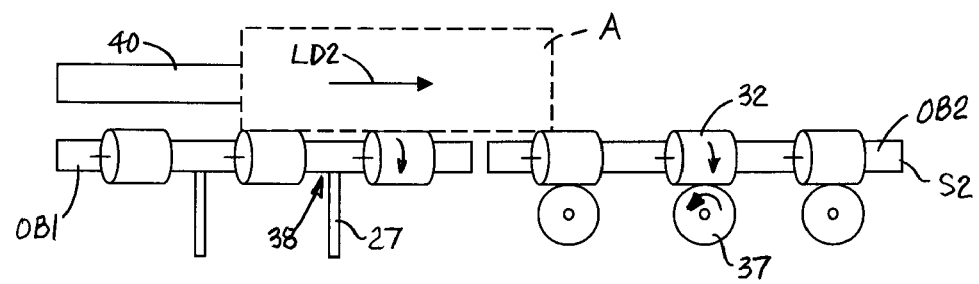
FIG. 8 is a portion of the cross section of the conveyor of FIG. 6 viewed along lines 8-8.
Figure 6:
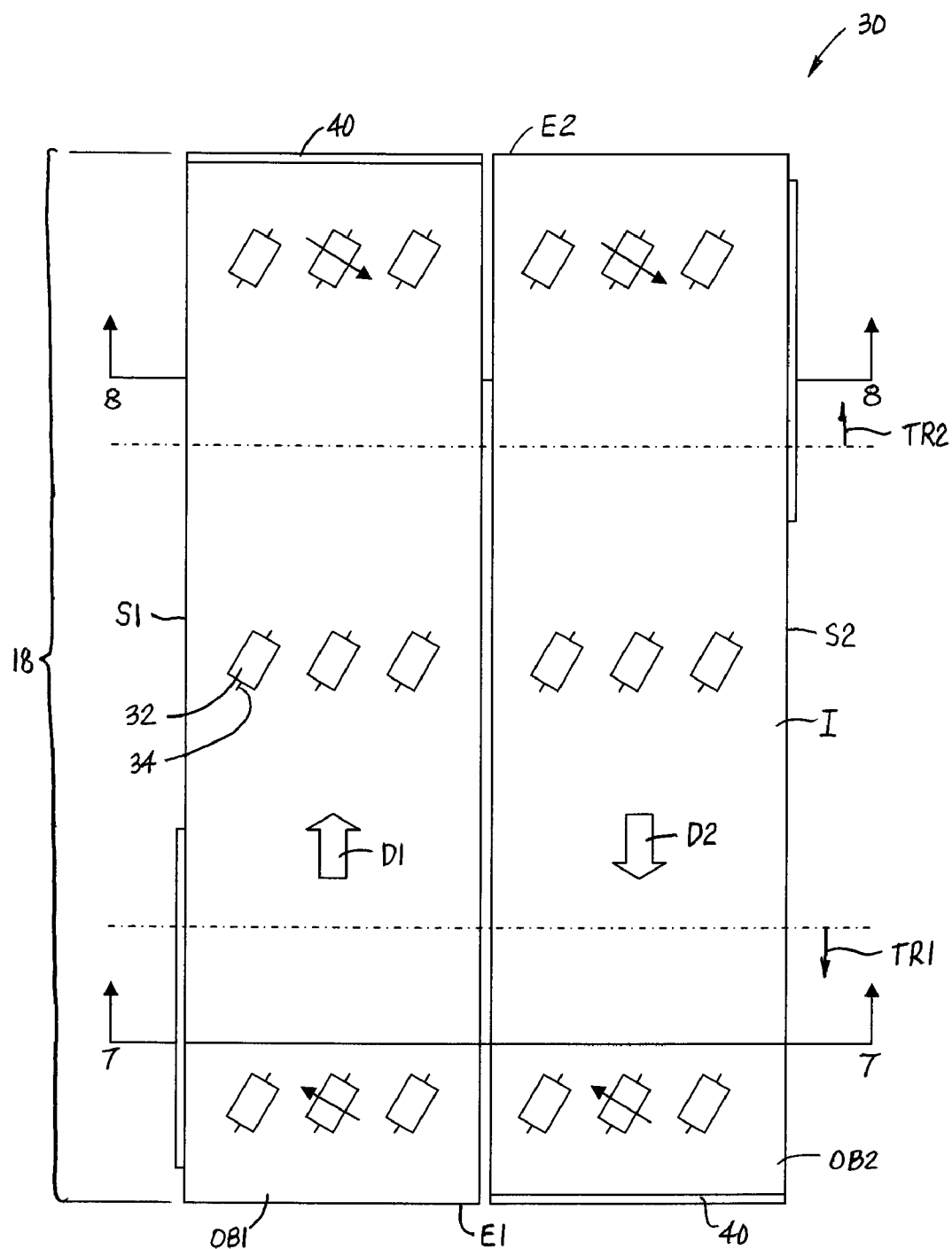
FIG. 6 is a top plan view of another version of a conveyor embodying features of the invention including oblique belt rollers.

Another version of a recirculating conveyor having a recirculation section 18 that uses a stop to help transfer articles is shown in FIGS. 6-8. In this version, the recirculating conveyor 30 comprises first and second oblique-roller conveyor belt OB1, OB2 traveling in opposite first and second directions D1, D2. The belt rollers 32 are arranged to rotate on axes 34 oblique to the first and second directions of belt travel. One example of such a belt is an INTRALOX® Series 400 Angled Roller belt. The operation of a conveyor system using such a belt is described in U.S. Pat. No. 6,968,941, "Apparatus and Methods for Conveying Objects," Nov. 29, 2005, to Matthew L. Fourney. The disclosure of that patent is incorporated by reference. As shown in FIG. 6, the axes 34 of the belt rollers 32 are parallel. In a first transfer region TR1, the oblique rollers in the first conveyor belt OB1 contact bearing surfaces 36 underlying the first conveyor belt. The bearing surfaces may be formed on a carryway pan, on linear wear strips extending in the first direction D1 along the first transfer region TR1, or on bearing rollers 37 rotatable on axes parallel to the first direction D1. As the first conveyor belt OB1 advances, the oblique belt rollers 32 rotate on the bearing surfaces 36 to push articles toward the first side 51 of the conveyor 30. The oblique belt rollers 32 in the second conveyor belt OB2 are idled in the first transfer region TR1. The second conveyor belt is supported in the first transfer region by wear strips 27 positioned in gaps 38 between the lanes of belt rollers 32. A stop 40 at a first end E1 of the recirculation section 18 blocks articles from advancing past the first end E1. When an article A supported atop the idled rollers encounters the stop 40, the forward motion of the second conveyor belt OB2 under the blocked article causes the oblique belt rollers to rotate backward as shown in FIG. 7. The backward rotation of the rollers causes the blocked article to translate sidewise along the stop in the first lateral direction LD1 to transfer to the first conveyor belt OB1. The stop could optionally include passive rollers on vertical axes for low-friction, rolling contact against articles sliding along it. As shown in FIG. 8, the oblique belt rollers 32 are actuated to rotate by a bearing surface 36 under the second conveyor belt OB2 and are idled under the first conveyor belt OB1 in a second transfer region TR2 at the second end E2 of the recirculation region 18. With a stop 40 blocking articles on the first conveyor belt OB1 at the second end E2, the oblique belt rollers 32 rotate as shown in FIG. 8 to push conveyed articles toward the second side S2. As in the carousel of FIG. 1, the belt rollers are idled in an intermediate region I of the recirculation section 18.

Thus, this version of a recirculation conveyor uses oblique-roller belts to provide a carousel.

The invention has been described in detail with reference to two versions. The details are used to help describe the invention and are not intended to limit the scope of the following claims.

What is claimed is:
1. A conveyor for recirculating articles, comprising:
a recirculation section extending in length from a first end to a second end and laterally in width from a first side to a second side;
a first conveyor belt having rotatable article-supporting rollers advancing continuously along the first side of the recirculation section in a first direction from the first end to the second end;
a second conveyor belt having rotatable article-supporting rollers, the second conveyor belt advancing continuously along the second side of the recirculation section in an opposite second direction from the second end to the first end;
wherein the rotatable article-supporting rollers in the first and second conveyor belts are rotated in a first lateral direction in a first transfer region of the of the recirculation section proximate the first end to push articles off the second conveyor belt onto the first conveyor belt and toward the first side in the first transfer region;

wherein the rotatable article-supporting rollers in the first and second conveyor belts are rotated in an opposite second lateral direction in a second transfer region of the recirculation section proximate the second end to push articles off the first conveyor belt onto the second conveyor belt and toward the second side in the second transfer region; and wherein the rotatable article-supporting rollers in the first and second conveyor belts are arranged to rotate on axes parallel to the first and second directions.

2. A conveyor as in claim 1 further comprising an intermediate region between the first and second transfer regions wherein the rotatable article-supporting rollers are idled.

3. A conveyor as in claim 1 further comprising a first side rail along the first side in the first transfer region and a second side rail along the second side in the second transfer region.

4. A conveyor as in claim 1 wherein the first and second conveyor belts abut each other.

5. A conveyor as in claim 1 wherein the first and second conveyor belts are identical.

6. A conveyor as in claim 1 wherein the first and second conveyor belts are the same length.

7. A conveyor as in claim 1 wherein the first conveyor belt extends in the second direction beyond the first end of the recirculation section.

8. A conveyor as in claim 7 wherein the second conveyor belt extends in the first direction beyond the second end of the recirculation section.

9. A conveyor as in claim 1 further comprising bearing rollers underlying the first and second conveyor belts and contacting the rotatable article-supporting rollers in the first and second transfer regions to cause the rollers to rotate as the first and second conveyor belts advance.

10. A conveyor as in claim 9 wherein the bearing rollers underlying the first conveyor belt in the first transfer region and the bearing rollers underlying the second conveyor belt in the second transfer region are arranged to rotate on first parallel axes oblique to the first and second directions and wherein the bearing rollers underlying the first conveyor belt in the second transfer region and the bearing rollers underlying the second conveyor belt in the first transfer region are arranged to rotate on second parallel axes oblique to the first and second directions and to the first parallel axes.

11. A method for recirculating articles on a conveyor, comprising:
conveying articles atop rollers in first and second conveyor belts advancing continuously in opposite directions;
rotating the rollers in the first and second conveyor belts in a first lateral direction in a first transfer region at one end of a recirculation section of the conveyor to push articles atop the rollers off the second conveyor belt and onto the first conveyor belt in the first transfer region;
rotating the rollers in the first and second conveyor belts in an opposite second lateral direction in a second transfer region at the opposite end of the recirculation section to push articles atop the rollers off the first conveyor belt and onto the second conveyor belt in the second transfer region.

12. The method of claim 11 further comprising:
idling the rollers in the first and second conveyor belts in an intermediate region of the conveyor between the first and second transfer regions.

13. A conveyor for recirculating articles, comprising:
a recirculation section extending in length from a first end to a second end and laterally in width from a first side to a second side;

a first conveyor belt having rotatable article-supporting rollers advancing continuously along the first side of the recirculation section in a first direction from the first end to the second end;

a second conveyor belt having rotatable article-supporting rollers, the second conveyor belt advancing continuously along the second side of the recirculation section in an opposite second direction from the second end to the first end;

wherein the rotatable article-supporting rollers in the first and second conveyor belts are rotated in a first lateral direction in a first transfer region of the of the recirculation section proximate the first end to push articles off the second conveyor belt onto the first conveyor belt and toward the first side in the first transfer region;

wherein the rotatable article-supporting rollers in the first and second conveyor belts are rotated in an opposite second lateral direction in a second transfer region of the recirculation section proximate the second end to push articles off the first conveyor belt onto the second conveyor belt and toward the second side in the second transfer region; and wherein the rotatable article-supporting rollers in the first and second conveyor belts are arranged to rotate on axes oblique to the first and second directions.

14. A conveyor as in claim 13 further comprising an intermediate region between the first and second transfer regions wherein the rotatable article-supporting rollers are idled.

15. A conveyor as in claim 13 further comprising bearing surfaces underlying and contacting the rotatable article-supporting rollers of the first conveyor belt in the first transfer region and the rotatable article-supporting rollers of the second conveyor belt in the second transfer to cause the rotatable article-supporting rollers to rotate as the first and second conveyor belts advance to push articles on the first conveyor belt toward the first side in the first transfer region and articles on the second conveyor belt toward the second side in the second transfer region.

16. A conveyor as in claim 15 further comprising a first stop at the at the second end of the recirculation section positioned to block articles conveyed on the first conveyor belt causing the rotatable article-supporting rollers in the first conveyor belt to rotate so as to push the blocked articles off the first conveyor belt and onto the second conveyor belt in the second transfer region and a second stop at the at the first end of the recirculation section positioned to block articles conveyed on the second conveyor belt causing the rotatable article-supporting rollers in the second conveyor belt to rotate so as to push the blocked articles off the second conveyor belt and onto the first conveyor belt in the first transfer region.

17. A conveyor as in claim 13 further comprising a first side rail along the first side in the first transfer region and a second side rail along the second side in the second transfer region.

18. A conveyor as in claim 13 wherein the first and second conveyor belts abut each other.

19. A conveyor as in claim 13 wherein the first and second conveyor belts are the same length.

20. A conveyor as in claim 13 wherein the first conveyor belt extends in the second direction beyond the first end of the recirculation section and the second conveyor belt extends in the first direction beyond the second end of the recirculation section.

* * * * *